(12) United States Patent
Schmid et al.

(10) Patent No.: US 6,696,808 B2
(45) Date of Patent: Feb. 24, 2004

(54) WINDSCREEN WIPER DEVICE FOR WIPING WINDSCREENS

(75) Inventors: Bernd Schmid, Lauffen am Neckar (DE); Eberhard Hoegler, Erligheim (DE)

(73) Assignee: Valeo Auto-Electric Wischer und Motoren GmbH (DE)

( * ) Notice: Subject to any disclaimer, the term of this patent is extended or adjusted under 35 U.S.C. 154(b) by 0 days.

(21) Appl. No.: 10/220,488

(22) PCT Filed: Feb. 26, 2001

(86) PCT No.: PCT/EP01/02126
§ 371 (c)(1),
(2), (4) Date: Aug. 29, 2002

(87) PCT Pub. No.: WO01/64488
PCT Pub. Date: Sep. 7, 2001

(65) Prior Publication Data
US 2003/0020422 A1 Jan. 30, 2003

(30) Foreign Application Priority Data
Mar. 1, 2000 (DE) .......................... 100 09 797

(51) Int. Cl.$^7$ .................. H02P 7/00; H02P 5/00
(52) U.S. Cl. ............ 318/445; 318/483; 318/643; 318/280; 318/282; 318/286
(58) Field of Search ............ 318/483, 643, 318/280–283, 286, 445, 466–468, 490

(56) References Cited

U.S. PATENT DOCUMENTS

| | | | | |
|---|---|---|---|---|
| 4,934,014 A | * | 6/1990 | Yamamoto | 15/250.13 |
| 5,086,260 A | * | 2/1992 | Ito | 318/266 |
| 5,453,676 A | * | 9/1995 | Agrotis et al. | 318/643 |
| 5,539,269 A | * | 7/1996 | Altmann et al. | 310/316.02 |
| 5,642,026 A | * | 6/1997 | McCann et al. | 318/806 |
| 5,861,723 A | * | 1/1999 | Koch | 318/285 |
| 5,892,343 A | * | 4/1999 | Mack et al. | 318/444 |
| 6,140,785 A | * | 10/2000 | Hogler | 318/282 |
| 6,249,098 B1 | * | 6/2001 | Miyazaki et al. | 318/280 |
| 6,388,411 B1 | * | 5/2002 | Ostrowski | 318/461 |
| 2003/0117102 A1 | * | 6/2003 | Moosmann et al. | 318/DIG. 2 |

FOREIGN PATENT DOCUMENTS

| | | | | |
|---|---|---|---|---|
| DE | 196 34 559 | | 3/1998 | |
| JP | 2003002173 A | * | 1/2003 | B60S/1/46 |

* cited by examiner

*Primary Examiner*—Robert Nappi
*Assistant Examiner*—Patrick Miller
(74) *Attorney, Agent, or Firm*—J. Gordon Lewis

(57) ABSTRACT

A windscreen wiper device and a method for wiping windscreens, including at least one motor whose direction of rotation can be altered, at least one wiper which is coupled to the motor and which moves back and forth between two reversing positions, a control device which switches the motor by means of switching signals and operating signals which are conveyed to the control device. The control device determines the switching signals from the operating signals to determine the reversing positions of the wiper. The degree of wetness of the windscreen surface is conveyed to the control mechanism and used as an operating signal.

20 Claims, 1 Drawing Sheet

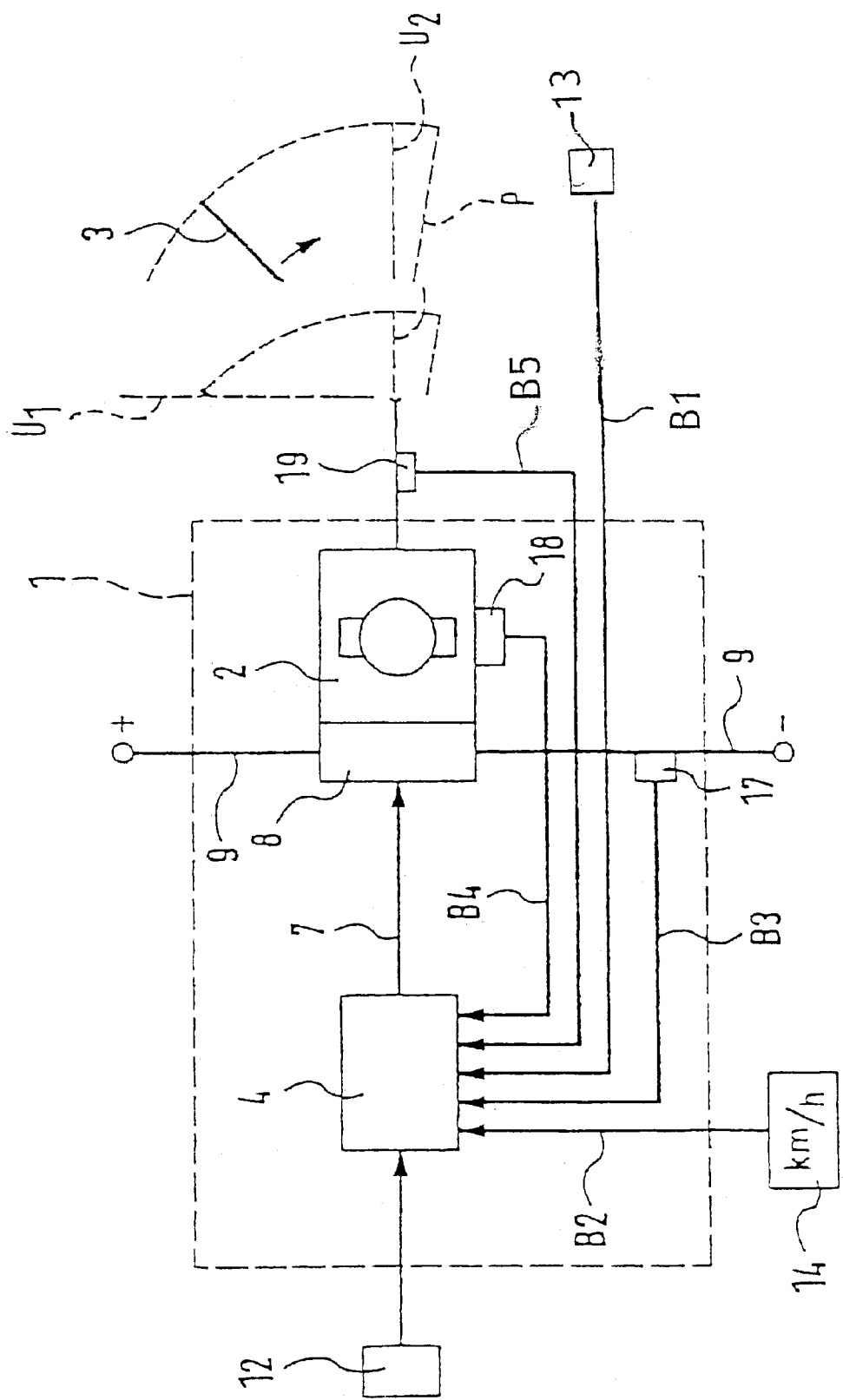

WINDSCREEN WIPER DEVICE FOR WIPING WINDSCREENS

BACKGROUND

The invention relates to a windshield wiper device for wiping windshields, having at least one motor whose direction can be reversed and at least one wiper oscillating between two reversal points coupled to the motor, having a control device which switches the motor by means of switching signals and having operating signals supplied to the control device, where the control device determines the switching signals from the operating signals and thus the reversal points of the wiper.

Such windshield wiper devices are known, for example, from DE 196 34 559 A1. The operating signals which are supplied to the control device are dependent on motor current. The result is that if the motor binds, for example, it is possible to reverse the motor prematurely because of the high current draw of the motor. The drive elements can advantageously be designed to be small. The disadvantage of this state of the art is, however, that with identical switching signals the wipe pattern between the reversal points of the wiper is larger with a wet windshield surface because of the lower frictional resistance between wiper and windshield surface than with a dry windshield surface. To prevent the wiper from striking the A-pillar of a vehicle, for example, with a high degree of wetness on the windshield surface, the wipe pattern from the state of the art is designed such that it demonstrates a certain safety margin to the A-pillar with a wet windshield. The result of this is that the wipe pattern between the reversal points with a drier windshield surface can be smaller by about 5° to 6° than with a wet windshield surface.

SUMMARY

The object of the present invention is therefore to prepare a windshield wiper device that optimizes the wipe pattern between the two reversal points of the wiper depending on the operating conditions of the wiper. Optimization can take the form of a reduction as well as an increase in the size of the wipe pattern.

This object is accomplished under the invention with a windshield wiper device of the type described above by providing the degree of wetness of the windshield surface as operating signals to the control device. The wipe pattern between the two reversal points can thereby be altered such that its size is always optimal, depending on the degree of wetness of the windshield surface. With a relatively dry windshield the wipe pattern can be enlarged in accordance with the invention; and reduced with a wet windshield because of the lower frictional resistance between windshield surface and wiper.

Advantageously the degree of wetness of the windshield surface is detected by a rain sensor. Modern vehicles have such a rain sensor to activate the windshield wiper device automatically, depending on the precipitation detected by the rain sensor. Under the invention the originally intended function of the rain sensor is expanded and is used to transmit operating signals to the control device.

In an advantageous aspect of the invention provision is made for signals dependent on vehicle speed to be supplied to the control device as additional operating signals. Because of the relatively high wind forces acting on the wiper, particularly at high vehicle speeds, the wipe pattern specifically between the two reversal points can be undesirably enlarged. The situation can occur that the wiper strikes the A-pillar, for example. Based on the operating signals identifying high vehicle speed, the wipe pattern between the two reversal points of the wiper can be reduced.

Advantageous provision can be made for vehicle speed to be detected by means of a speed sensor. Speed sensors are found in the speedometer units of vehicles, for example, so that the speed determined through the speedometer, for example, can be utilized directly or indirectly as an operating signal.

In another preferred embodiment of the invention, signals dependent on motor current are supplied to the control device as additional operating signals. Specifically in combination with the operating signals for the degree of wetness of the windshield surface and for vehicle speed, high frictional resistance between the wiper and the windshield can be recognized by detecting motor current. High load on the motor indicates higher frictional resistance between wiper and windshield, whereby the wiping angle can be corrected under the invention by enlarging it. Low motor load, on the other hand, indicates low friction between the wiper and the windshield surface, whereby a reduction of the wipe pattern between the two reversal points can be implemented by the control device.

An ammeter, for example, can be provided to determine motor current.

In another aspect of the invention, signals depending on motor over-run after it has been switched off, or after it reverses, are supplied to the controls as operating signals. Motor over-run unintentionally affects the wipe pattern between the two reversal points of the wiper. By detecting over-run, it is possible to reverse the motor earlier, so that precise correction of the over-run is possible.

Motor over-run can be detected advantageously by means of a counter. The type, construction and function of such a counter is known from DE 197 10 099 C2, for example.

Under the invention provision can be made for signals depending on wiper speed to be supplied to the control device as additional operating signals. Because of the inertia of the wiper and the linkage located between the motor and the wiper, for example, higher wiper speed results in increased flexibility in the windshield wiper device and consequently to an increase in size of the wipe pattern between the two reversal points. Using the appropriate control device, operating signals for higher wiper speed can consequently result in the wipe pattern between the two reversal points being reduced in size.

By using a suitable measurement signal it is possible to determine wiper speed. It is also conceivable that a motion sensor located on the wiper shaft can be used or that the switching signals which determine wiper speed are detected directly.

The object stated above is also achieved by means of a process to operate a windshield wiper device having at least one wiper oscillating between two reversal points, which is driven by a motor whose direction can be reversed, having a control device switching the motor by means of switching signals and having operating signals supplied to the control device, where the control device determines the switching signals from the operating signals and thus the reversal points of the wiper, the process being characterized in that the degree of wetness of the windshield surface is supplied to the control device as operating signals.

In addition to the degree of wetness of the windshield surface as an operating signal, signals are conceivable which are dependent on vehicle speed and/or motor current and/or motor over-run after the motor is switched off and/or wiper speed.

Advantageously the control device is adjusted to its base setting with the vehicle stationary.

BRIEF DESCRIPTION OF THE DRAWING

Additional advantageous embodiments and details of the invention can be found in the subsequent description, in which the invention is described and explained in greater detail from the aspects shown in the drawing.

The FIGURE is a schematic diagram of one embodiment of the present invention.

DETAILED DESCRIPTION

One embodiment of the inventive windshield wiper device is depicted schematically in the drawing. A windshield wiper device 1 is shown having a motor 2 whose direction can be reversed. A wiper 3 is connected to the motor 2, the wiper oscillating between two reversal points $U_1$ and $U_2$. In addition to the two reversal points, a park position P for the wiper is indicated schematically. Furthermore there is a control device 4 which controls the motor by means of switching signals. The motor 2 has an output module 8 to which the preferably digital switching signals 7 are supplied. The motor 2 is provided with current via the output module 8 from the positive feed and negative ground wires 9 to the output module 8.

Furthermore, there is an operating switch 12 by means of which the wiper 3 is switched on or off through the control device 4 and the motor 2.

The control signals 7 are stored as base signals in the control device 4. Depending on how the operating switch 12 is activated, control signals 7 are delivered to the motor 2, resulting in interval wipe, normal or high-speed wipe for the wiper 3. To correct the control signals 7, different operating signals B1–B5 are supplied to the control device 4. The operating signals B1–B5 exercise a corrective effect on the control device 4 and the switching signals 7, depending on the operating status of the wiper device 1, or depending on the environmental factors affecting the wiper 3.

The degree of wetness of the windshield surface, which is generated by a rain sensor 13, is supplied to the control device 4 as an operating signal B1. With a relatively dry windshield, the frictional resistance between the wiper 3 and the windshield is relatively high, a result of which the ensuing wipe pattern between the two reversal points $U_1$ and $U_2$ is smaller than with a wet windshield. Based on the operating signal B1, a correction is made to enlarge the wipe pattern, with a dry windshield it is correspondingly reduced.

Vehicle speed is supplied to the control device 4 as an operating signal B2 through a vehicle speed sensor 14. At high vehicle speed, relatively high wind forces are acting on the wiper 3, as a result of which the wipe pattern between the two reversal points $U_1$ and $U_2$ is enlarged. Consequently, the effect of operating signals B2 is that a correction is made to reduce the wipe pattern of the wiper 3 at high vehicle speeds.

The motor current present at the motor 2 can also be supplied to the control device 4 as an additional operating signal B3. Motor current is determined by means of a current measuring device 17, for example, an ammeter. In principle, higher current is present at the motor 4 with a dry windshield, where the frictional resistance between the wiper 3 and the windshield surface is relatively high, higher than with a dry windshield. Accordingly, with a higher motor current a correction is made to enlarge the wipe pattern of the wiper 3. However, provision can be made for the direction of the motor 2 to be reversed in the event that a specific threshold for motor load is exceeded to prevent overloading of the motor 2.

Over-run of the motor 2 is also supplied to the control device 4 as an additional operating signal B4 after the motor 2 is switched off or reversed. Over-run of the motor 2 is detected by means of a counter 18. A magnetic sensor can be located on the armature of the motor 2, for example, which passes through the detection range of a magnetic field sensor as the armature rotates. The counter counts the number of armature revolutions after the motor 2 is switched off. Motor 2 run-on determined in this way at a reversal point $U_1$ or $U_2$ can be taken into consideration at the subsequent reversal point such that the motor 2 is switched off or reversed accordingly. In this way the desired intended reversal point for the motor 2 can be precisely achieved.

The speed of the wiper 3 can also be supplied to the control unit 4 as operating signal B5. The speed of the wiper 3 is determined preferably by means of suitable measurement signals or a motion sensor 19.

In the event of high wiper speed 3, the flexibility of the wiper 3 as well as that of the wiper linkage connected to and located between motor 2 and wiper 3 increases. As a result of this increase in flexibility, the wipe pattern of the wiper 3 between the two reversal points $U_1$ and $U_2$ becomes larger. The control unit 4 can intervene to make a correction through operating signal B5.

The wiper device 1 shown and described in the drawing has the specific advantage that operating influences affecting the wipe pattern between the two reversal points $U_1$ and $U_2$ are supplied to the control unit 4 in the form of operating signals B1–B5, and the control unit 4 determines the optimal wipe pattern of the wiper 3 adapted to operating conditions and supplies them to the output module 8 or the motor 2 respectively by way of the switching signals 7. Corrections are made to increase or decrease the wipe angle depending on operating conditions and environmental factors.

All the features enumerated in the description, the subsequent claims and the drawings can be fundamental to the invention both individually and in any combination with each other.

What is claimed is:

1. A windshield wiper device for wiping windshields, comprising:

at least one motor whose direction can be reversed;

at least one wiper oscillating between two reversal points, the at least one wiper coupled to the motor; and a control device which switches the motor by means of switching signals using operating signals as input signals supplied to the control device, wherein the control device determines settings of the reversal points of the wiper using the operating signals, a degree of wetness of the surface of the windshield supplied as one of the operating signals to the control device and signals dependent on motor current supplied to the control device as operating signals.

2. The windshield wiper device of claim 1, further comprising:

a rain sensor determining the degree of wetness of the windshield.

3. The windshield wiper device of claim 1, wherein signals dependent on vehicle speed are supplied to the control device as operating signals.

4. The windshield wiper device of claim 3, further comprising:

a vehicle speed sensor determining a vehicle speed.

5. The windshield wiper device of claim 1, wherein an ammeter determines the motor current.

6. A windshield wiper device for wiping windshields, comprising:

at least one motor whose direction can be reversed;

at least one wiper oscillating between two reversal points, the at least one wiper coupled to the motor; and a control device which switches the motor by means of switching signals using operating signals supplied to the control device, wherein the control device determines the reversal points of the wiper using the operating signals, a degree of wetness of the surface of the windshield supplied as one of the operating signals; and wherein signals dependent on the over-run of the motor after the motor is switched off or reversed are supplied to the control device as operating signals.

7. The windshield wiper device of claim 6, wherein the over-run of the motor is determined by means of a counter.

8. The windshield wiper device of claim 1, wherein signals dependent on the speed of the wiper are supplied to the control device as operating signals.

9. The windshield wiper device of claim 8, further comprising:

a motion sensor supplying measuring signals for determining the speed of the wiper.

10. A method of operating a windshield wiper device having at least one wiper oscillating between two reversal points, the method comprising the steps of:

driving the at least one wiper using a motor whose direction can be reversed;

switching the motor by means of switching signals from a control device;

supplying operating signals to the control device, wherein the control device determines the settings of the two reversal points using the operating signals;

supplying a degree of wetness of the windshield to the control device as one of the operating signals; and supplying signals dependent on motor current to the control device as operating signals.

11. The method from claim 10, further comprising the step of:

supplying signals dependent on vehicle speed to the control device as operating signals.

12. A method of operating a windshield wiper device having at least one wiper oscillating between two reversal points which is driven by a motor whose direction can be reversed, a control device switching the motor by means of switching signals and by operating signals supplied to the control device, wherein the control device determines the switching signals and thereby the reversal points of the wiper, characterized by the steps of supplying the degree of wetness of the windshield to the control device as operating signals and supplying signals dependent on the over-run of the motor after the motor is switched off or reversed to the control device as operating signals.

13. The method of claim 10, further comprising the step of:

initially setting the reversal points using the control device at a time when the vehicle is stationary.

14. The windshield wiper device of claim 1 wherein signals dependent on the over-run of the motor after the motor is switched off or reversed are supplied to the control device as operating signals.

15. The windshield wiper device of claim 14, further comprising:

a counter for determining the over-run of the motor.

16. The windshield wiper device of claim 6, further comprising;

a vehicle speed sensor for supplying a speed of the vehicle speed as one of the operating signals to the control device.

17. The windshield wiper device of claim 6, further comprising:

a rain sensor for determining the degree of wetness of the windshield.

18. The method of claim 10, further comprising the step of:

supplying signals dependent on the over-run of the motor after the motor is switched off or reversed to the control device as operating signals.

19. The method of claim 12, further comprising the step of:

supplying signals dependent on vehicle speed to the control device as operating signals.

20. The method of claim 12, further comprising the step of:

initially setting the reversal points using the control device at a time when the vehicle is stationary.

\* \* \* \* \*